(12) United States Patent
Fischer et al.

(10) Patent No.: US 11,415,239 B2
(45) Date of Patent: Aug. 16, 2022

(54) VALVE LINEAR DRIVE AND VALVE

(71) Applicant: Bürkert Werke GmbH & Co. KG, Ingelfingen (DE)

(72) Inventors: Florian Fischer, Ingelfingen (DE); Ralf Strasswiemer, Ingelfingen (DE); Maik Fuchs, Ingelfingen (DE); Georg Moll, Ingelfingen (DE); Vinoth Pathmanathan, Ingelfingen (DE)

(73) Assignee: BÜRKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 17/339,145

(22) Filed: Jun. 4, 2021

(65) Prior Publication Data

US 2021/0381606 A1 Dec. 9, 2021

(30) Foreign Application Priority Data

Jun. 5, 2020 (DE) ...................... 10 2020 115 057.1

(51) Int. Cl.
*F16K 31/00* (2006.01)
*F16K 7/14* (2006.01)
*F16K 27/02* (2006.01)

(52) U.S. Cl.
CPC .............. *F16K 31/007* (2013.01); *F16K 7/14* (2013.01); *F16K 27/0236* (2013.01); *F16K 2200/302* (2021.08)

(58) Field of Classification Search
CPC ........ F16K 31/007; F16K 31/004; F16K 7/14; F16K 7/16; F16K 7/12; F16K 31/0641;
(Continued)

(56) References Cited

U.S. PATENT DOCUMENTS 1,605,399 A * 11/1926 Fornaca .................. F01L 1/462
267/176
1,753,024 A * 4/1930 Rode ...................... F16K 17/082
251/291
(Continued)

FOREIGN PATENT DOCUMENTS

DE         19 41 055 A     2/1971
DE    10 2005 051 949 A1   5/2007
(Continued)

OTHER PUBLICATIONS

"Engineering Metrology" by N. Sinha (publicly available in the Internet since Nov. 2016; http://home.iitk.ac.in/~nsinha/Metrology.pdf); pp. 26-32 (Year: 2016).*

*Primary Examiner* — David Colon-Morales
(74) *Attorney, Agent, or Firm* — McNees Wallace & Nurick LLC (57) ABSTRACT

A valve linear drive provided for connection to a valve body having a valve seat includes a drive housing, a valve closure member, an actuator, and a spring device. The valve closure member is adjustable along an adjustment axis (V) between an open position and a closed position by means of the actuator and an actuating means. The spring device urges the actuating means into the open position or into the closed position. Further, the spring device includes a plurality of springs and a receiving unit for the springs. Here, each spring has its own spring chamber formed in the receiving unit, in which the associated spring is inserted. Furthermore, a valve having such a valve linear drive is provided.

19 Claims, 4 Drawing Sheets

(58) Field of Classification Search
CPC ............. F16K 31/0672; F16K 27/0236; F16K 2200/302; F16K 31/0655
USPC .................................................. 251/337, 331
See application file for complete search history.

(56) References Cited

U.S. PATENT DOCUMENTS

| | | | | |
|---|---|---|---|---|
| 2,679,860 | A * | 6/1954 | Diebold | G01L 7/00 137/859 |
| 2,722,943 | A * | 11/1955 | Reinecke | E03C 1/108 137/217 |
| 3,095,011 | A * | 6/1963 | Banker | F15B 13/14 137/625.69 |
| 3,175,473 | A * | 3/1965 | Boteler | F16K 31/1262 92/128 |
| 3,904,175 | A * | 9/1975 | Deschenes | F16K 7/17 137/116.5 |
| 4,280,601 | A * | 7/1981 | Patriquin | F16F 9/368 188/316 |
| 5,092,360 | A * | 3/1992 | Watanabe | F16K 31/007 252/62.9 R |
| 5,094,430 | A * | 3/1992 | Shirai | F16K 31/007 251/86 |
| 5,135,024 | A * | 8/1992 | LeBlanc | F16K 17/04 137/543.17 |
| 5,145,147 | A * | 9/1992 | Nakazawa | F16K 31/007 251/337 |
| 5,520,001 | A * | 5/1996 | Miyamoto | F16K 7/14 62/50.7 |
| 6,520,479 | B1 * | 2/2003 | Sato | F16K 31/007 251/84 |
| 10,247,326 | B2 * | 4/2019 | Schupp | H01L 41/23 |
| 11,092,985 | B1 * | 8/2021 | Handley | G01F 15/005 |
| 2001/0038083 | A1 * | 11/2001 | Sakurai | F16K 31/007 251/129.06 |
| 2010/0127196 | A1 * | 5/2010 | Sawada | F16K 31/007 251/129.06 |
| 2010/0294964 | A1 * | 11/2010 | Matsumoto | F16K 51/02 251/129.01 |
| 2014/0374634 | A1 * | 12/2014 | Ohtsuki | F16K 31/007 700/282 |
| 2015/0369378 | A1 * | 12/2015 | Umeyama | G05D 7/0635 137/486 |
| 2016/0047483 | A1 * | 2/2016 | Hirose | F16K 25/005 137/602 |
| 2016/0245422 | A1 * | 8/2016 | Ishii | F16K 31/007 |
| 2018/0003312 | A1 | 1/2018 | Schupp et al. | |
| 2020/0393051 | A1 * | 12/2020 | Kondo | F16K 7/17 |

FOREIGN PATENT DOCUMENTS

| | | | |
|---|---|---|---|
| DE | 10 2016 112 115 A1 | 1/2018 | |
| DE | 102016223536 A1 * | 5/2018 | ........... F02M 21/023 |
| WO | WO-2013141212 A1 * | 9/2013 | ........... F15B 15/1447 |

* cited by examiner

VALVE LINEAR DRIVE AND VALVE

FIELD OF THE INVENTION

The invention relates to a valve linear drive for connection to a valve body having a valve seat, and to a valve having such a valve linear drive.

BACKGROUND

Valves for open-loop or closed-loop control of fluids are disclosed in the prior art, which include a valve body and a valve linear drive formed separately from the valve body. The valve linear drive and the valve body are connected to each other to form the valve.

The valve linear drive includes a drive unit, for example a piezoelectric actuator. The drive unit can adjust a valve closure member by means of an actuating means or an actuating mechanism provided in the valve linear drive. In this way, the valve linear drive can move the valve closure member at least to an open position and/or a closed position, in which the valve closure member rests on a valve seat formed in the valve body and seals it, so that no fluid can flow through the valve.

It is further known from the prior art to employ a spring device to urge the actuating means into the open position in the case of a so-called normally open valve (NO valve), or into the closed position in the case of a so-called normally closed valve (NC valve), in order to ensure a defined valve position in the event of a failure of the drive unit.

Due to temperature-related or service life-related changes or manufacturing-related tolerances, it poses a challenge, in particular in the case of NC valves, to ensure a long-lasting and reliable sealing of the valve seat by means of the spring device.

It is therefore the object of the invention to provide a valve linear drive and a valve in which a defined valve position is reliably ensured even in the event of a failure of the drive unit.

SUMMARY

The invention provides a valve linear drive for connection to a valve body having a valve seat. The valve linear drive has a drive housing, a valve closure member, an actuator, and a spring device. The valve closure member is adjustable along an adjustment axis between an open position and a closed position by means of the actuator and a force-transmitting actuating means interposed between the valve closure member and the actuator. The spring device urges the actuating means into the open position or into the closed position. Further, the spring device includes a plurality of springs and a receiving unit for the springs. Here, each spring has its own spring chamber formed in the receiving unit, in which the associated spring is inserted. Furthermore, a valve having such a valve linear drive is provided.

It has been found that in the case of spring devices having a single spring, the transverse forces in the spring that occur when the spring device or the spring is loaded impair the return of the actuating means to the defined valve position. By providing a spring device having a plurality of springs, the load is distributed among the springs and transverse forces occur in each spring. In contrast to a single spring, these transverse forces can at least partially compensate each other, whereby the resulting transverse forces are minimized and a defined valve position can be reliably ensured. The spring chambers ensure an optimum arrangement of the springs in relation to each other and with respect to the valve seat. Also, the spring chambers act as a guide and can thus limit the transverse forces occurring in the springs. The receiving unit furthermore allows the assembly effort to be kept at a low level.

In this way, in particular, the seat tightness in an NC valve is improved.

The spring device preferably comprises at least three springs to effectively minimize the transverse forces that occur.

The springs are, in particular, helical springs or, more generally, compression springs.

Furthermore, the spring device engages the actuating means, in particular in the axial direction.

In one embodiment, the actuator is a piezoelectric actuator.

In a further embodiment, the springs are each supported at one of their ends against the drive housing, which ensures a defined transmission of force and allows the valve linear drive to have a particularly compact design.

The receiving unit may include an axial lead-through, through which the actuating means extends. Here, a clearance fit is provided between the actuating means and the receiving unit, so that the receiving unit has play perpendicularly to the adjustment axis in relation to the actuating means. When the springs are loaded, the transverse forces in the springs may result in that the relative position of the receiving unit will correspondingly change slightly with respect to the actuating means, and the transverse forces resulting therefrom are reduced.

Further, it may be provided that the receiving unit includes a sleeve element. In particular, here the springs are each supported at one of their ends against the sleeve element, and/or the spring device engages the actuating means in the axial direction by means of the sleeve element. In this way, the valve linear drive can have a particularly compact design. In addition, this configuration ensures an effective operative connection of the springs to the actuating means.

According to one embodiment, the receiving unit includes a spring drum having the spring chambers.

Here, the spring drum may have an axial opening through which the sleeve element extends with a clearance fit. The clearance fit allows the relative position of the spring drum in relation to the sleeve element to correspondingly change slightly perpendicularly to the adjustment axis, so that reduced resultant transverse forces occur when the springs are loaded.

According to a further embodiment, the sleeve element includes a radially projecting collar against which the springs are each supported at one end, as a result of which the springs are effectively supported on the sleeve element and introduce their spring force into the sleeve element.

It may be provided that the springs are received in the spring chambers with a clearance fit in the radial direction. The clearance fit ensures that when the springs are loaded, they can deform and/or shift to a limited extent in the spring chambers perpendicularly to the adjustment direction, as a result of which smaller transverse forces can appear in the springs. At the same time, the clearance fit ensures that the spring chambers guide the springs radially, thus ensuring a defined action of the springs.

In particular, the springs are not fixed in place by means of pins that engage in the springs, for example via the ends thereof in the case of spiral springs.

Furthermore, each spring chamber may be a recess in the form of a cylinder, the height of which in the axial direction is smaller than that of the unloaded springs. In this way, the spring chamber can constitute a guide for a substantial part of the spring without the spring losing its function.

In one embodiment, the springs are arranged with their central axes on a circle that is arranged to be concentric with the adjustment axis. Here, in particular, the springs are distributed equidistantly over the circle, so that all springs have the same angular distance from springs that are adjacent to them. This symmetrical arrangement of the springs ensures a homogeneous distribution of the load on the springs and a defined valve position by the springs.

The valve closure member includes, for example, a diaphragm which is moved by the actuating means when the actuating means is adjusted between the open and closed positions. In particular, the diaphragm transitions into the actuating means in one piece. This configuration has the advantages that the valve linear drive is constructed from a particularly small number of individual parts and exhibits a particularly high degree of tightness.

To achieve the above-mentioned object, according to the invention there is also provided a valve, in particular an NC valve, having a valve linear drive according to the invention as well as a valve body having a valve seat and having the advantages mentioned above.

Here, the actuating means may include a tappet coupled to the valve closure member and having a radial shoulder against which the receiving unit presses in the axial direction. In particular, the shoulder is in alignment with the valve seat as viewed in the axial direction, so that a particularly high seat tightness is ensured in the closed position.

According to one embodiment, the diaphragm has an external, annular sealing section which is clamped between the valve body and the drive housing. In this way, a reliable attachment can be produced in a simple manner.

Additionally or alternatively, the annular sealing section may be welded to the valve body and/or the drive housing to ensure a particularly tight connection.

In addition, according to a further embodiment, the valve closure member fluidically separates a fluid space formed between the valve body and the valve closure member from a control space formed between the drive housing and the valve closure member. In this way, an effective and permanent separation of media between the fluid space and the control space can be ensured.

Furthermore, the valve body includes at least one inflow duct and/or at least one outflow duct. The ducts are sealed by means of the valve closure member in the closed position.

Further advantages and features will be apparent from the description below and from the accompanying drawings, in which:

DETAILED DESCRIPTION

Figure 1:
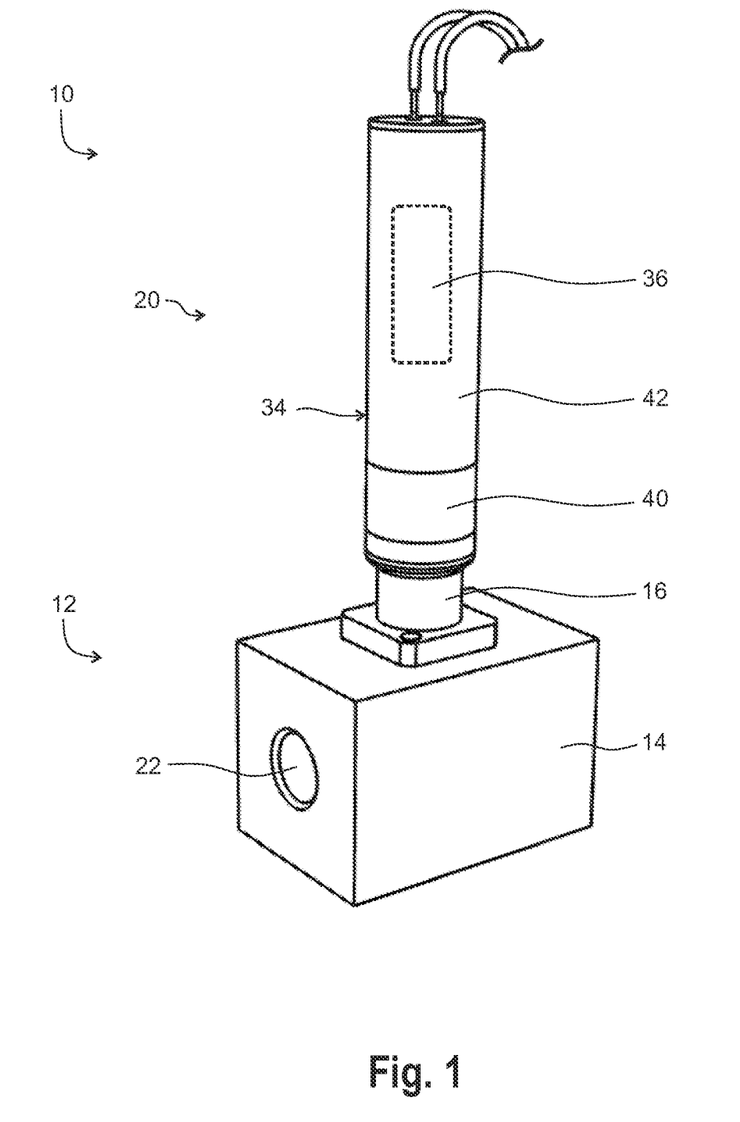
FIG. 1 shows a schematic illustration of a valve according to the invention with a valve linear drive according to the invention.

FIG. 1 shows a valve 10 which is employed for open- or closed-loop control of fluids. In the embodiment shown, the valve 10 is of a multi-part construction and comprises a valve body 12 having a base body 14 and a flange section 16 protruding from the base body 14, and a valve linear drive 20 having an axial end coupled to the flange section 16.

The base body 14 has a fluid inlet 22, through which a fluid to be open-loop or closed-loop controlled is supplied to the valve 10, and a fluid outlet, through which the fluid can exit the valve 10. The fluid outlet is provided opposite to the fluid inlet 22 in the base body 14 here and is not shown in FIG. 1.

The flange section 16 (see FIG. 3) further has an inflow duct 24 formed therein, which is in fluid communication with the fluid inlet 22. In a switching position not shown in FIG. 3, the inflow duct 24 opens into a fluid space 26, which in turn is in fluid communication with four outflow ducts 28 (see FIG. 2), which open into the fluid outlet.

In an alternative embodiment, the flange section 16 may, of course, include any desired number of inflow ducts 24 and/or outflow ducts 28.

The valve body 12 is formed, more particularly, from a corrosion-resistant material. Particularly the inner surfaces of the fluid-carrying ducts and spaces are made from a corrosion-resistant material.

Furthermore, the inflow duct 24 has a valve seat 30 (see FIG. 3) associated therewith, with which a valve closure member 32 of the valve linear drive 20 cooperates in order to provide open-loop or closed-loop control of the flow through the valve 10, as will be further discussed below.

Figure 2:
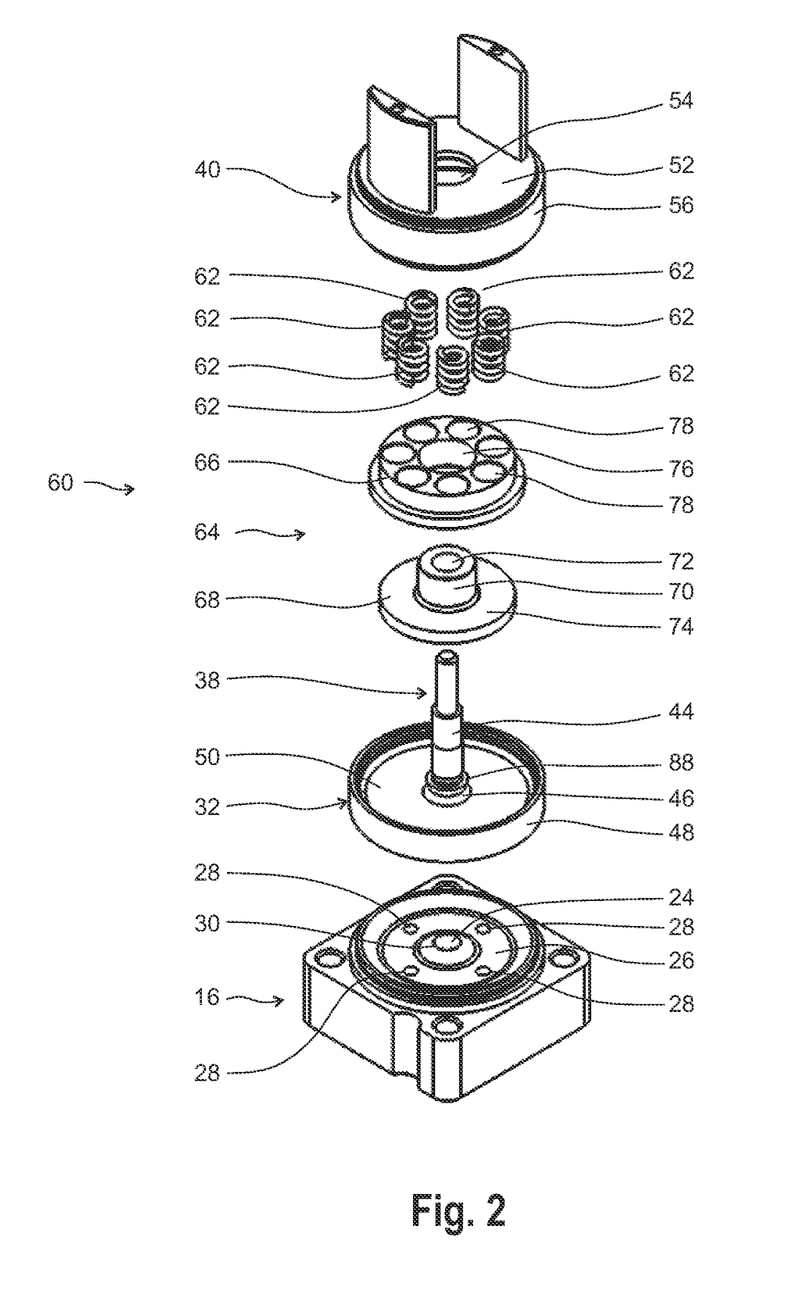
FIG. 2 shows an exploded view of part of the valve according to FIG. 1.

The valve linear drive 20 comprises a drive housing 34 (see FIG. 1), an actuator 36, and an actuating means 38 (see FIG. 2).

The drive housing 34 has a multi-part configuration and comprises a pot-shaped lower part 40 and a sleeve-shaped upper part 42 placed thereon, in which the actuator 36 is received.

The actuator 36 is intended to serve as a drive unit and is coupled in a force-transmitting manner to the valve closure member 32 by means of the actuating means 38.

In the present exemplary embodiment, the actuator 36 is a piezoelectric actuator in the form of a stack actuator.

Basically, however, the actuator 36 may be any desired actuator, in particular any desired piezoelectric actuator.

A change in length of the actuator 36 is transmitted to the valve closure member 32 by means of the actuating means 38, whereby the valve closure member 32 can be adjusted in the axial direction along the adjustment axis V between an open position, in which the valve seat 30 is open and the inflow duct 24 is fluidically connected to the outflow ducts 28, and a closed position, in which the valve seat 30 is closed and the inflow duct 24 is fluidically separated from the outflow ducts 28.

The actuating means 38 here comprises a tappet 44 (see FIG. 3), which extends in the axial direction as far as to the valve closure member 32 and, for example, continues into it.

The valve closure member 32 includes, in an axial prolongation of the tappet 44, a valve sealing section 46 which is associated with the inflow duct 24 or the valve seat 30 and is opposite thereto in the axial direction. In the closed position, the valve sealing section 46 presses against the valve seat 30 so that the latter is closed.

In addition, the valve closure member 32 includes an annular radially outer sealing section 48 and a diaphragm 50, which extends radially from the annular sealing section 48 to the valve sealing section 46 and delimits the fluid space 26.

In an alternative embodiment, the valve sealing section 46 may be part of the diaphragm 50, i.e., the diaphragm 50 extends over the entire area enclosed by the annular sealing section 48.

The annular sealing section 48 has a greater axial thickness D than the diaphragm 50 that extends radially inwardly from the annular sealing section 48.

In the illustrated embodiment, the tappet 44 is formed in one piece with the valve closure member 32, for example by the tappet 44 being welded to the valve sealing section 46. Thus, the diaphragm 50 integrally transitions into the actuating means 38.

In an alternative embodiment, of course, the valve closure member 32 and the actuating means 38 may be provided as separate components that are appropriately coupled to each other.

The pot-shaped lower part 40 has a bottom 52 with a central lead-through 54 through which the actuating means 38 extends in the axial direction, and a circumferential wall 56 that extends in the axial direction from the bottom 52 toward the flange section 16.

The bottom 52 and the valve closure member 32 define a control space 58, which is permanently sealed from the fluid space 26 by the valve closure member 32. Accordingly, the valve closure member 32 constitutes a sealing barrier at the same time.

Furthermore, the valve closure member 32 is clamped with the sealing section 48 between the circumferential wall 56 and the flange section 16, so that the annular sealing section 48 seals both the fluid space 26 and the control space 58 from the outside.

Additionally or alternatively, after the valve linear drive 20 has been coupled to the valve body 12, the valve closure member 32 may be connected by a substance-to-substance bond, in particular welded, to the pot-shaped lower part 40 and/or the flange section 16 via the annular sealing section 48 in order to reliably hermetically seal the valve 10.

The valve linear drive 20 further includes a spring device 60, the function and structure of which will be discussed below with reference to FIGS. 2 to 5.

The spring device 60 comprises seven springs 62 as well as a receiving unit 64 with a spring drum 66 and a separate sleeve element 68.

In an alternative embodiment, the spring drum 66 and the sleeve element 68 may be formed together as one piece.

The sleeve element 68 has a sleeve section 70 having an outside diameter $d_1$ (see FIG. 3) and a central axial lead-through 72 having a diameter $d_2$ and extending through the sleeve element 68 coaxially with the adjustment axis V, and a collar 74 that is arranged at an axial end of the sleeve section 70 and projects radially beyond it, i.e. has a larger outside diameter.

The spring drum 66 has a central axial opening 76 having a diameter $d_3$ and extending through the spring drum 66 coaxially with the adjustment axis V.

The sleeve element 68 and the spring drum 66 are arranged coaxially with each other and with the adjustment axis V. Furthermore, the sleeve section 70 is arranged radially within the axial opening 76. The outside diameter $d_1$ of the sleeve section 70 and the diameter $d_3$ of the axial opening 76 each have a size here such that the spring drum 66 is mounted radially on the sleeve section 70 with a clearance fit.

The spring drum 66 further comprises seven spring chambers 78 which are arranged around the axial opening 76 in the shape of a ring. Each spring chamber 78 here constitutes a receptacle for a respective spring 62. In other words, each spring 62 is arranged in a respective separate spring chamber 78.

The spring chambers 78 are each cylindrical recesses extending through the spring drum 66 in the axial direction, and may be drilled holes, for example.

In an alternative embodiment, in particular in the case of a one-part receiving unit 64, the spring chambers 78 may not extend completely through the spring drum 66 or the receiving unit 64 in the axial direction and may, for example, be in the form of blind holes.

The central axes 80 (see FIG. 3) of the spring chambers 78 are located on a circle 82 (see FIG. 5) having a radius R, which is arranged to be concentric with the adjustment axis V. Each angle α between the central axes 80 of neighboring spring chambers 78 here is one seventh of the circumference of a circle, i.e. about 51.43 degrees, as a result of which the spring chambers 78 are evenly distributed over the circle 82.

The springs 62 are identically shaped helical compression springs, each having a first end 84 and an opposite, second end 86.

In principle, in an alternative embodiment, the springs 62 may each be formed by any one or more spring elements.

The diameters of the spring chambers 78 and of the springs 62 are matched to each other such that the springs 62 are received in the spring chambers 78 with a clearance fit in the radial direction.

The spring device 60 is disposed in the control space 58 coaxially with the adjustment axis V between the bottom 52 and the valve closure member 32. The tappet 44 extends through the axial lead-through 72 in the axial direction and, in the region of the sleeve section 70, has an outside diameter $d_4$ which is matched to the diameter $d_2$ of the axial lead-through 72 such that the spring device 60 is mounted on the tappet 44 with a clearance fit in the radial direction.

The springs 62 are each supported by their first end 84 against the bottom 52 and by their second end 86 against the radial collar 74.

In the closed position, the springs 62 are each at least partly compressed and act on the sleeve element 68 by a spring force $F_F$ in the axial direction away from the bottom 52.

In the uncompressed state, the springs 62 accordingly each have an axial length that is greater than the axial height H of the spring chambers 78, so that they would correspondingly protrude from the spring chambers 78 in the axial direction.

The spring device 60 here is supported on a radial shoulder 88 of the tappet 44 by means of the sleeve element 68 and presses the valve closure member 32 into the closed position using the spring force $F_F$.

Here, the radial shoulder 88 of the tappet 44 is arranged in alignment with the valve seat 30, i.e. the valve seat 30 intersects the radial shoulder 88 when they are theoretically shifted parallel to the adjustment axis V into a common plane.

Here, the radial shoulder 88 is accommodated in a coaxial, pocket-shaped recess 90 (see FIG. 3) in the sleeve element 68, as a result of which the valve linear drive 20 has a particularly compact design.

Owing to this installation situation, the individual springs 62 act independently of one another and can at least partly compensate for a multi-dimensional state of stress. Especially transverse forces $F_Q$ acting radially in relation to the adjustment axis V and which may impair a defined position of the valve closure member 32 and thus the tightness of the valve seat 30 in the closed position are reduced or compensated.

In particular the mounting by means of clearance fits of the components that transmit the spring force $F_F$ causes any transverse forces $F_Q$ that occur to be effectively reduced.

The number of springs 62 and the properties thereof are selected according to the requirements and the sizing of the valve 10.

In the illustrated embodiment, a multitude of the components, such as the tappet 44, the receiving unit 64, the springs 62 and the spring chambers 78, include portions having a circular cylindrical geometry. Of course, in an alternative embodiment, each of these components or portions may be configured as desired, in particular as a cylinder having any desired base area.

Figure 3:
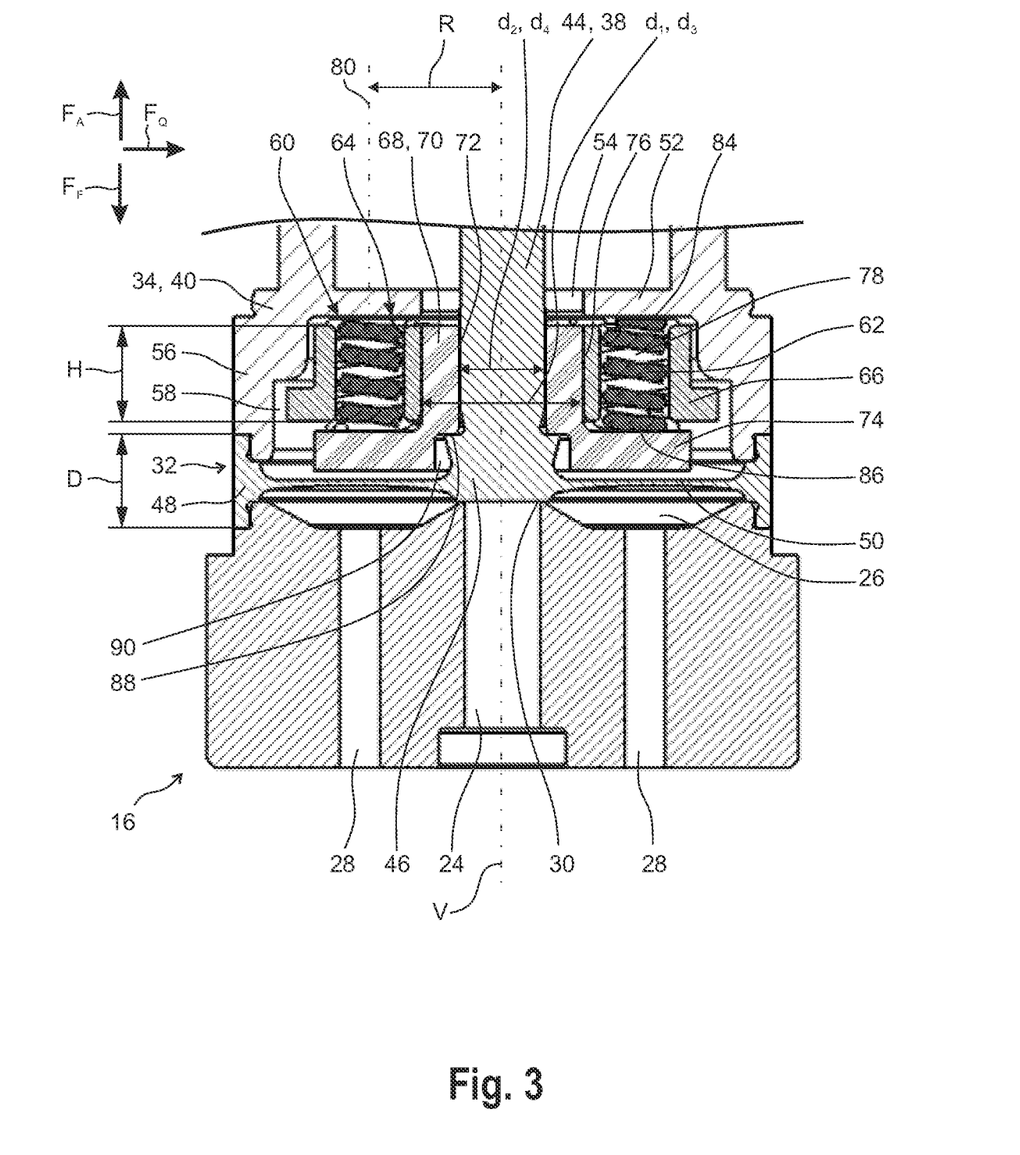
FIG. 3 shows a sectional representation of part of the valve according to FIG. 1, with the valve linear drive in the closed position.
Figure 4:
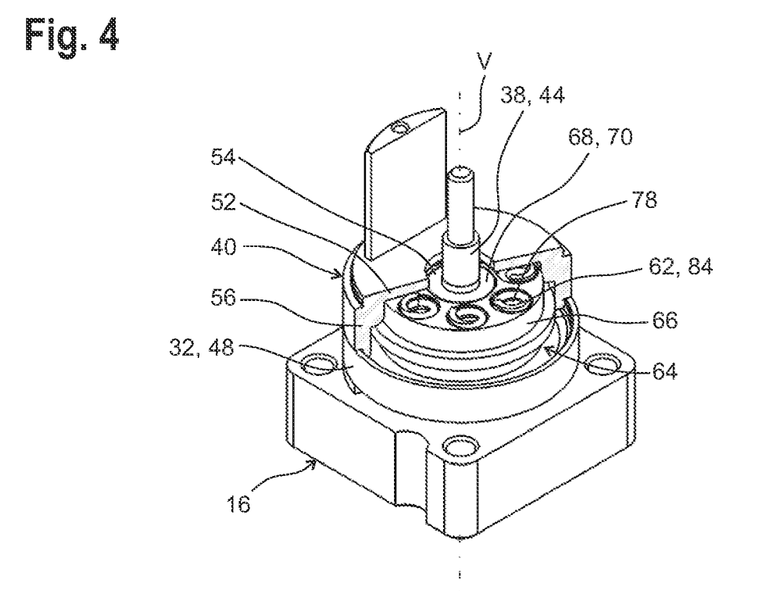
FIG. 4 shows a perspective view of part of the valve according to FIG. 1 with a partly exposed housing part and valve body.
Figure 5:
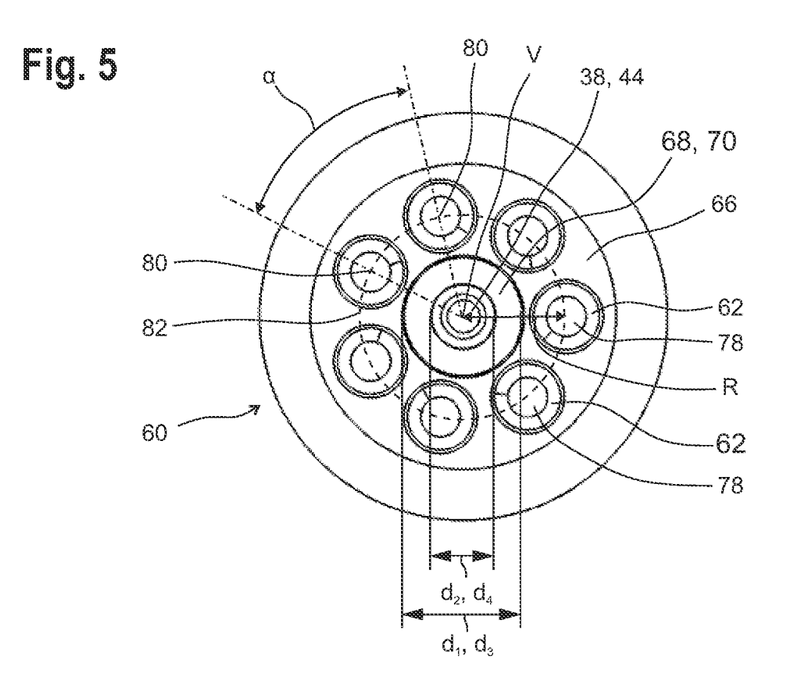
FIG. 5 shows a top view of the spring device of the valve according to FIG. 1.

The mode of operation of the valve 10 will be discussed below with reference to FIG. 3.

The valve 10 is a normally closed valve, that is, an NC valve. This means that the valve closure member 32 is in its closed position when no voltage is applied to the piezoelectric actuator 36. This closed position is shown in FIG. 3.

To transfer the valve 10 from its closed position to its open position, a voltage is applied to the piezoelectric actuator 36, which exerts a driving force FA on the actuating means 38.

Accordingly, the driving force FA originating from the piezoelectric actuator 36 is greater than the spring force $F_F$ of the spring device 60, so that the valve closure member 32 can be shifted counter to the spring force $F_F$ of the spring device 60.

To transfer the valve 10 from its open position to its closed position, the piezoelectric actuator 36 is simply de-energized or the voltage previously applied is no longer applied. This causes the piezoelectric actuator 36 to return to its initial position in terms of valve control engineering. The spring force $F_F$ of the spring device 60 presses the valve closure member 32 onto the valve seat 30 in a sealing manner. This clearly shows that the valve 10 is a normally closing valve.

In an alternative embodiment, the valve 10 may be a normally open valve, that is, a NO valve. This means that the valve closure member 32 is in its open position when no voltage is applied to the piezoelectric actuator 36. In this case, the valve linear drive 20 is correspondingly designed such that the spring device 60 exerts a spring force $F_F$ on the actuating means 38, which pulls the valve closure member 32 away from the valve seat 30 into the open position, for example, by the springs 62 being configured as tension springs or by the spring device 60 being provided on the opposite side of the bottom 52, so that the bottom 52 is arranged between the valve closure member 32 and the spring device 60, and the spring device 60 bears against a radial shoulder 88 of the tappet 44 opposite to the bottom 52.

Therefore, in all embodiments, a valve linear drive 20 and a valve 10 having a spring device 60 are provided which when subjected to a load exhibit low transverse forces $F_Q$ and thus reliably ensure a defined valve position.

The invention claimed is:

1. A valve linear drive for connection to a valve body having a valve seat, comprising:
 a drive housing;
 a valve closure member;
 an actuator; and
 a spring device,
 wherein the valve closure member is adjustable along an adjustment axis between an open position and a closed position by the actuator and a force-transmitting actuating device interposed between the valve closure member and the actuator,
 wherein the spring device urges the actuating device into the open position or into the closed position,
 wherein the spring device includes a plurality of springs and a receiving unit for the springs,
 wherein each spring has its own spring chamber formed in the receiving unit, in which the associated spring is inserted, and
 wherein the receiving unit includes an axial lead-through through which the actuating device extends, a clearance fit being provided between the actuating device and the receiving unit.

2. The valve linear drive according to claim 1, wherein the springs are supported at one end against the drive housing.

3. The valve linear drive according to claim 1, wherein the receiving unit includes a sleeve element.

4. The valve linear drive according to claim 3, wherein the springs are supported at one end against the sleeve element.

5. The valve linear drive according to claim 3, wherein the spring device engages the actuating device in an axial direction via the sleeve element.

6. The valve linear drive according to claim 3, wherein the receiving unit includes a spring drum having the spring chambers.

7. The valve linear drive according to claim 6, wherein the spring drum has an axial opening through which the sleeve element extends with a clearance fit.

8. The valve linear drive according to claim 3, wherein the sleeve element includes a radially projecting collar against which the springs are supported at one end.

9. The valve linear drive according to claim 1, wherein the springs are received in the spring chambers with a clearance fit in a radial direction.

10. The valve linear drive according to claim 1, wherein each spring chamber is a recess in the form of a cylinder in which a height in an axial direction is smaller than that of the unloaded springs.

11. The valve linear drive according to claim 1, wherein the springs are arranged with their central axes on a circle which is arranged to be concentric with the adjustment axis.

12. The valve linear drive according to claim 11, wherein the springs are distributed equidistantly over the circle.

13. The valve linear drive according to claim 1, wherein the valve closure member includes a diaphragm which is moved by the actuating device.

14. The valve linear drive according to claim 13, wherein the diaphragm transitions into the actuating device in one piece.

15. A valve comprising:
 a valve linear drive for connection to a valve body having a valve seat, the valve linear drive including:
 a drive housing;
 a valve closure member;
 an actuator; and
 a spring device,
 wherein the valve closure member is adjustable along an adjustment axis between an open position and a closed position by the actuator and a force-transmitting actuating device interposed between the valve closure member and the actuator, wherein the spring device urges the actuating device into the open position or into the closed position, wherein the spring device includes a plurality of springs and a receiving unit for the springs, wherein each spring has its own spring chamber formed in the receiving unit, in which the associated spring is inserted, and comprising the valve body having the valve seat, and wherein the actuating device includes a tappet coupled to the valve closure member and having a radial shoulder against which the receiving unit presses in an axial direction.

16. The valve according to claim 15, wherein the shoulder is aligned with the valve seat as viewed in the axial direction.

17. The valve according to claim 15, wherein the valve closure member includes a diaphragm which is moved by the actuating device, wherein the diaphragm has an external annular sealing section which is clamped between the valve body and the drive housing and/or welded to the valve body and/or the drive housing.

18. The valve according to claim 15, wherein the valve closure member fluidically separates a fluid space formed between the valve body and the valve closure member from a control space formed between the drive housing and the valve closure member.

19. A valve linear drive for connection to a valve body having a valve seat, comprising:

a drive housing;

a valve closure member;

an actuator; and a spring device, wherein the valve closure member is adjustable along an adjustment axis between an open position and a closed position by the actuator and a force-transmitting actuating device interposed between the valve closure member and the actuator, wherein the spring device urges the actuating device into the open position or into the closed position, wherein the spring device includes a plurality of springs and a receiving unit for the springs, wherein each spring has its own spring chamber formed in the receiving unit, in which the associated spring is inserted, wherein the receiving unit includes a sleeve element, and wherein the spring device engages the actuating device in an axial direction via the sleeve element.

* * * * *